K. JUNG.
AUTOMATIC MACHINE FOR PROFILE TURNING.
APPLICATION FILED JULY 22, 1914.

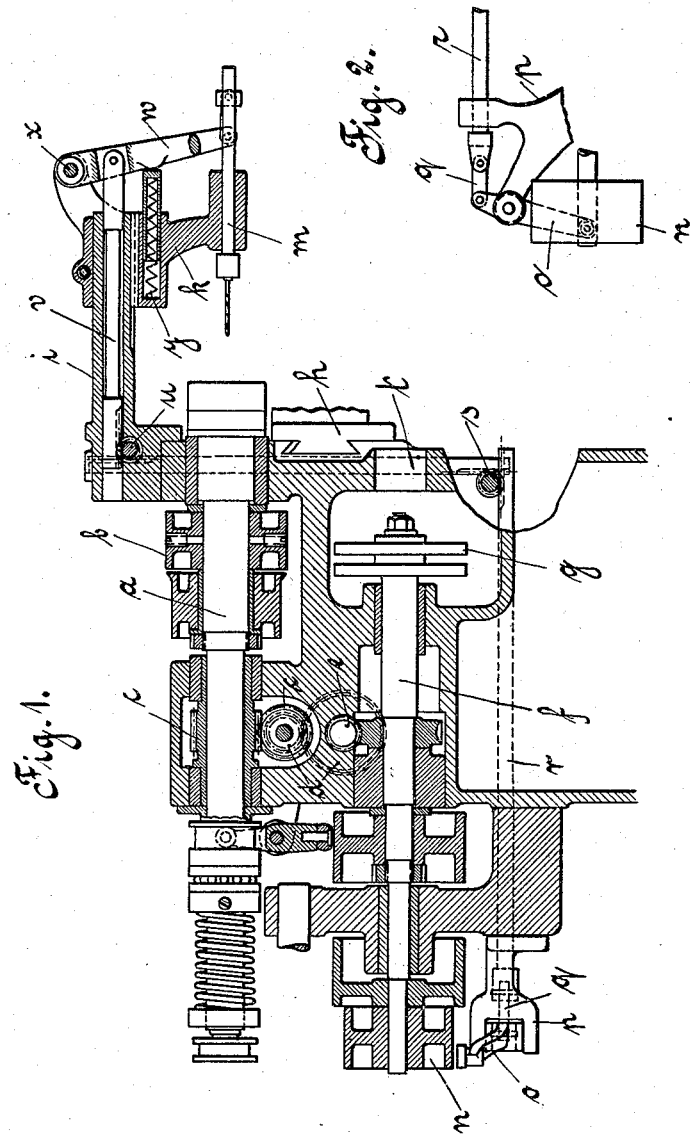

1,152,641.

Patented Sept. 7, 1915.
2 SHEETS—SHEET 2.

UNITED STATES PATENT OFFICE.

KARL JUNG, OF BERLIN, GERMANY, ASSIGNOR TO THE GENERAL COMPOSING COMPANY, GESELLSCHAFT MIT BESCHRÄNKTER HAFTUNG, OF BERLIN, GERMANY, A CORPORATION.

AUTOMATIC MACHINE FOR PROFILE-TURNING.

1,152,641.  Specification of Letters Patent.  Patented Sept. 7, 1915.

Application filed July 22, 1914. Serial No. 852,478.

*To all whom it may concern:*

Be it known that I, KARL JUNG, manager, a subject of the German Emperor, and residing at 58/59 Grossbeerenstrasse, Berlin, State of Prussia and German Empire, have invented certain new and useful Improvements in or Relating to Automatic Machines for Profile-Turning, of which the following is a specification.

In automatic machines for profile turning, it is necessary, in addition to moving tools in the transverse direction which are arranged on the traverse slide rest, to feed other tools in the axial direction toward the work, for instance for boring and screw cutting. For that reason it has been necessary in such machines to lengthen the bed so that it is possible to arrange the tool carrying and controlling mechanism, in front of the work spindle. This resulted in the drawback that the shavings could not fall freely from the machine, but remained on the bed, and moreover access to the work was rendered more difficult.

The invention obviates this drawback by arranging the mechanism for carrying and controlling the tools to be brought toward the work from the front, above the work spindle, so that the whole space in front of, and below the work is free, and the shavings can fall freely from the machine which is rendered completely accessible.

A construction according to this invention is illustrated in the accompanying drawing in which—

Figure 3:
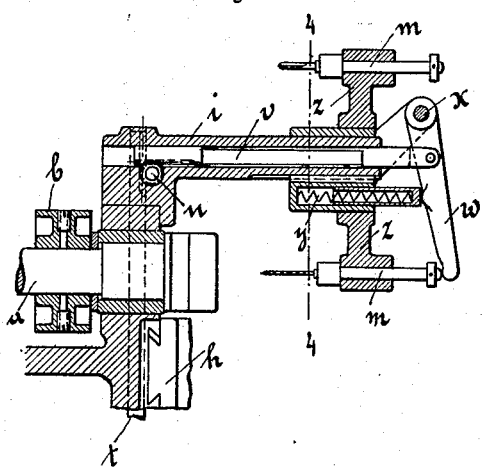
Figure 4:
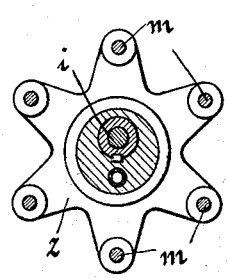

Figure 1 is a section through an automatic device and Fig. 2 is a detail of the same, in plan. Fig. 3 is a part of Fig. 1, it shows, however, a modified construction of the tool holder. Fig. 4 is a section on line 4—4, Fig. 3.

In the drawing, the work spindle $a$ carries on the right hand side the chuck for fixing the work. The drive is effected by means of the pulley $b$. The spindle $a$ drives, by means of worm wheels $c$, toothed wheels $d$ and worm gear $e$, the control spindle $f$ which is provided in the known manner with cam disks $g$ for controlling the traverse-slides $h$, as well as with other cams for operating the feed of material, etc.

The tool which is fed toward the work from the front, for example a drill as in the construction illustrated in Fig. 1, is mounted in a separate support or bracket $i$, secured to the frame of the machine above the work spindle $a$. In order to make possible an adjustment relatively to the work spindle $a$, the support $i$ is made in two parts, and the part $k$ is adjustable in the axial direction relatively to the stationary or fixed part $i$. If several tools which become operative one after another are used, for instance a drill, a rimer, a screwcutter, etc., the part $k$ is replaced by a tool holder $z$ (Figs. 3 and 4) pivoted about the part $i$ and arranged like a capstan head or turret.

The driving of the spindle $m$, that is to say, its movement in the axial direction toward the work, is controlled by a cam disk $n$ which acts at a suitable moment on a lever $o$ mounted in a fork $p$ and moving a connecting rod $r$ by means of a member $q$. The said connecting rod is formed at its free end as a rack and engages with a gear wheel $s$ which also engages with an upward connecting rod $t$. The upper end of the latter rod $t$ is also made in the form of a rack and meshes with a gear wheel $u$, and the latter engages again with a rack-shaped end of another connecting rod $v$, the free end of which is pivoted to the lever $w$. As the rod $t$ must be mounted laterally in order to be able to pass in front of the spindle $a$, the gear wheels $s$ and $n$ must be made of corresponding width, or each two such wheels must be arranged on a short cross spindle mounted in the machine.

The lever $w$ is mounted on the part $k$ so as to rotate about the pin $x$, and its free end is pivoted to the spindle $m$, so that when the rod $r$ moves to the left under the action of the cam disk $n$, the rod $t$ is moved downward, the rod $v$ to the left, and consequently the spindle $m$ toward the work, in order to bring its tool into the working position. The return of the parts to the inoperative position is effected by the spring $y$.

Having now particularly described and ascertained the nature of my said invention and in what manner the same is to be performed, I declare that what I claim is:—

1. In an automatic machine for profile turning in combination a bed, a work spindle arranged above the bed, tools to be fed from the front side in the axial direction toward the work and a support for these tools said support being arranged above the work spindle and said bed and being substantially in the same vertical plane with the front end of the spindle, thereby keeping free the space in front of and below the spindle for the purpose to allow the shavings to fall freely.

2. In an automatic machine for profile turning in combination a bed, a work spindle arranged above the bed, tools to be fed from the front side in the axial direction toward the work, a support and a controlling mechanism for these tools said support and controlling mechanism being arranged in part above the work spindle and said bed and being substantially in the same vertical plane with the front end of the spindle, thereby keeping free the space in front of and below the spindle for the purpose to allow the shavings to fall freely.

3. In an automatic machine for profile turning, in combination, a bed, a work spindle arranged above the bed, tools to be fed from the front side in the axial direction toward the work, means for carrying said tools arranged above the work spindle, and means for controlling said tools, said bed ending substantially in the same vertical plane with the front end of the spindle and said last mentioned means, thereby keeping free the space in front of and below the spindle for the purpose of allowing the shavings to fall freely.

4. In an automatic machine for profile turning in combination a bed, a work spindle, tools to be fed from the front side in the axial direction toward the work, a support for said tools arranged above the work spindle and a bearing on which the said support is mounted, said support being longitudinally adjustable on said bearing.

5. In an automatic machine for profile turning in combination a bed, a work spindle, tools to be fed from the front side in the axial direction toward the work, a support for said tools arranged above the work spindle, a bearing, on which the said support is mounted and means for controlling said tools said means being partly guided by said bearing.

6. In an automatic machine for profile turning in combination a bed, a work spindle, tools to be fed from the front side in the axial direction toward the work, a support for said tools arranged above the work spindle, a bearing, on which the said support is mounted and means for controlling said tools said support being longitudinally adjustable on said bearing and said bearing guiding partly said means substantially as described and for the purpose specified.

In testimony whereof I have affixed my signature in presence of two witnesses.

KARL JUNG.

Witnesses:
WOLDEMAR HAUPT,
HENRY HASPER.

Copies of this patent may be obtained for five cents each, by addressing the "Commissioner of Patents, Washington, D. C."